(12) United States Patent
Willingham

(10) Patent No.: US 10,154,713 B2
(45) Date of Patent: Dec. 18, 2018

(54) COIL PRO

(71) Applicant: Daniel Clinton Willingham, St. Louis, MO (US)

(72) Inventor: Daniel Clinton Willingham, St. Louis, MO (US)

(73) Assignee: Coil Pro, LLC, St. Louis, MO (US)

( * ) Notice: Subject to any disclaimer, the term of this patent is extended or adjusted under 35 U.S.C. 154(b) by 61 days.

(21) Appl. No.: 15/260,389

(22) Filed: Sep. 9, 2016

(65) Prior Publication Data
US 2018/0070688 A1 Mar. 15, 2018

(51) Int. Cl.
*A45B 3/00* (2006.01)
*B65H 75/44* (2006.01)
*F16B 7/14* (2006.01)
*A45B 3/14* (2006.01)

(52) U.S. Cl.
CPC .................. *A45B 3/00* (2013.01); *A45B 3/14* (2013.01); *B65H 75/4465* (2013.01); *B65H 75/4476* (2013.01); *F16B 7/1418* (2013.01)

(58) Field of Classification Search
CPC B65H 75/406; B65H 75/446; B65H 75/4476; A45B 3/00; A45B 3/14; F16B 7/105
USPC ............. 211/107, 110, 111, 133.4, 196, 205; 248/230.1, 230.4, 230.5, 230.2, 441.1; 294/143, 159, 169; 242/404.3, 407.1, 242/607.1
See application file for complete search history.

(56) References Cited

U.S. PATENT DOCUMENTS

| | | | | |
|---|---|---|---|---|
| 605,607 A | * | 6/1898 | Koch | B65H 75/406 242/404.3 |
| 1,085,729 A | * | 2/1914 | Gore | B65H 75/406 24/115 J |
| 1,365,762 A | * | 1/1921 | Zinow | F21V 21/16 15/323 |
| 1,728,106 A | * | 9/1929 | Collins | B65H 75/24 242/400.1 |
| 2,956,762 A | * | 10/1960 | Alston | B65H 75/4476 248/87 |
| 2,979,013 A | * | 4/1961 | Whittall | B63B 21/54 114/221 R |
| 3,290,453 A | * | 12/1966 | Jensen | B65H 75/4476 174/135 |
| 4,123,012 A | * | 10/1978 | Hough | B65H 75/06 242/405.2 |
| 4,277,035 A | * | 7/1981 | Gaski | H02G 11/02 242/129 |
| 4,437,625 A | * | 3/1984 | VanSickle | B65H 49/30 242/129 |
| 4,475,698 A | * | 10/1984 | Militello | B65H 54/585 242/405.3 |
| 4,586,675 A | * | 5/1986 | Brown | B65H 75/4476 242/405.2 |

(Continued)

FOREIGN PATENT DOCUMENTS

WO WO-2011156712 A2 * 12/2011 ............. B65H 75/28
WO WO-2013083884 A1 * 6/2013 ............... B65G 7/12

*Primary Examiner* — Joshua E Rodden

(57) ABSTRACT

A coiling device on which a rope, extension cord, or other materials can be coiled. A coiling device allows for additional tools to be included and/or coupled to it. A coiling device that can be coupled to a shaft, whether telescopic or otherwise. A coiling device that can be coupled to a shaft via a clamp.

9 Claims, 25 Drawing Sheets

(56) References Cited

U.S. PATENT DOCUMENTS

| | | | | |
|---|---|---|---|---|
| 4,778,125 A * | 10/1988 | Hu | ......................... | H02G 11/02 |
| | | | | 191/12.2 R |
| 5,348,240 A * | 9/1994 | Carmo | .................... | B65H 75/04 |
| | | | | 242/401 |
| 5,979,816 A * | 11/1999 | Blankenship | ........... | B63B 21/04 |
| | | | | 114/218 |
| 6,158,686 A * | 12/2000 | Lawrence | ............... | B65H 54/58 |
| | | | | 242/129 |
| 6,237,885 B1 * | 5/2001 | Mitchell | ................... | A47H 3/02 |
| | | | | 248/205.1 |
| 6,302,347 B1 * | 10/2001 | Amirault | ................ | B65H 75/06 |
| | | | | 242/388.1 |
| 6,510,599 B2 | 1/2003 | AmRhein | | |
| 6,719,259 B2 * | 4/2004 | Huang | ................. | A47B 96/061 |
| | | | | 248/230.2 |
| 7,261,564 B2 | 8/2007 | Sutula | | |
| 9,284,155 B2 * | 3/2016 | Stanton | ................ | B65H 75/242 |
| 9,573,788 B2 * | 2/2017 | Coburn | ................ | B65H 75/406 |
| 2007/0039912 A1 * | 2/2007 | Hinkens | ................. | B65H 75/06 |
| | | | | 211/71.01 |
| 2009/0302148 A1 * | 12/2009 | Auclair | .................... | A47F 7/005 |
| | | | | 242/588.2 |
| 2011/0220754 A1 * | 9/2011 | Merten | .............. | B65H 75/4476 |
| | | | | 242/400.1 |
| 2016/0152437 A1 * | 6/2016 | Stanton | ................ | B65H 75/406 |
| | | | | 242/578.2 |

\* cited by examiner

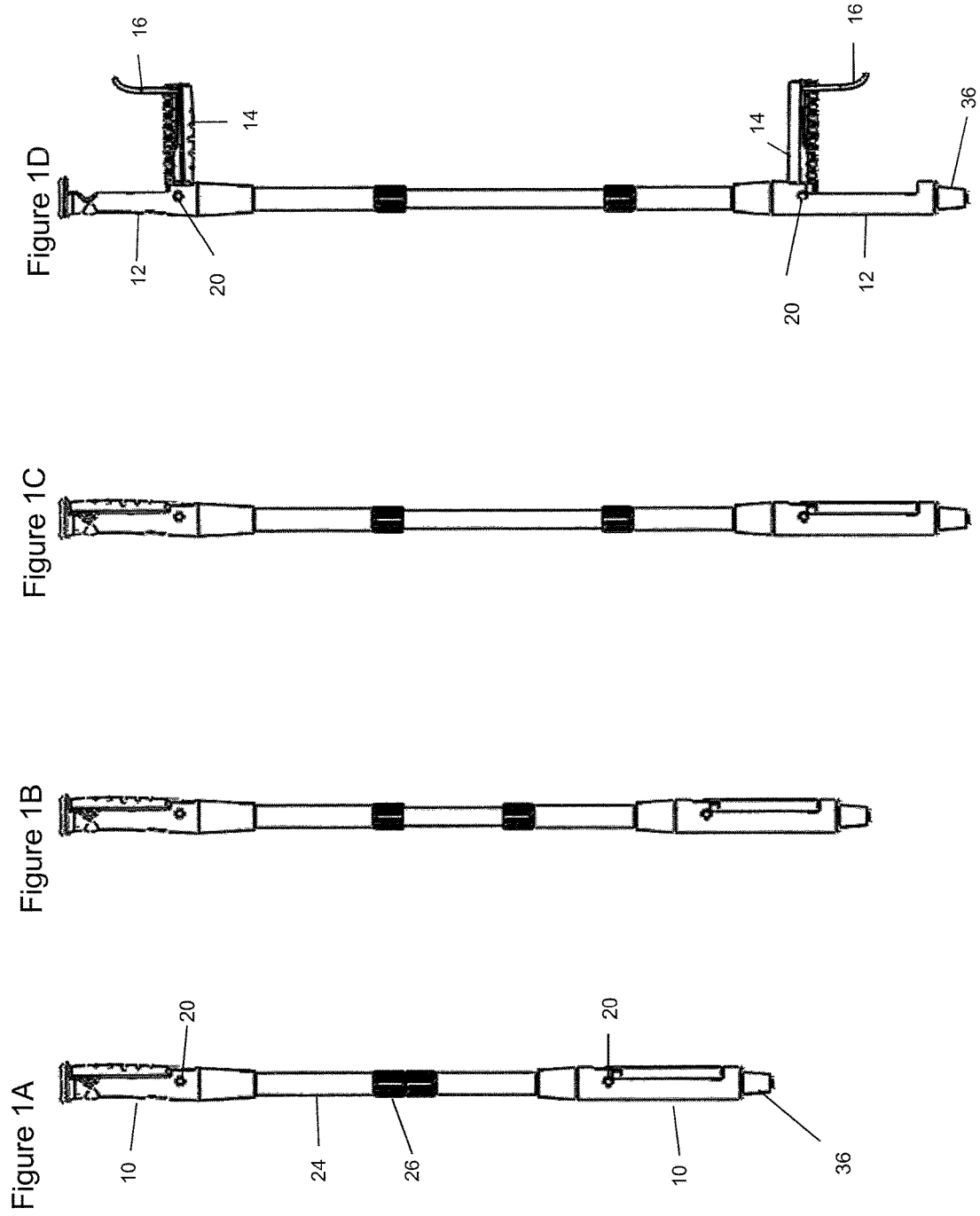

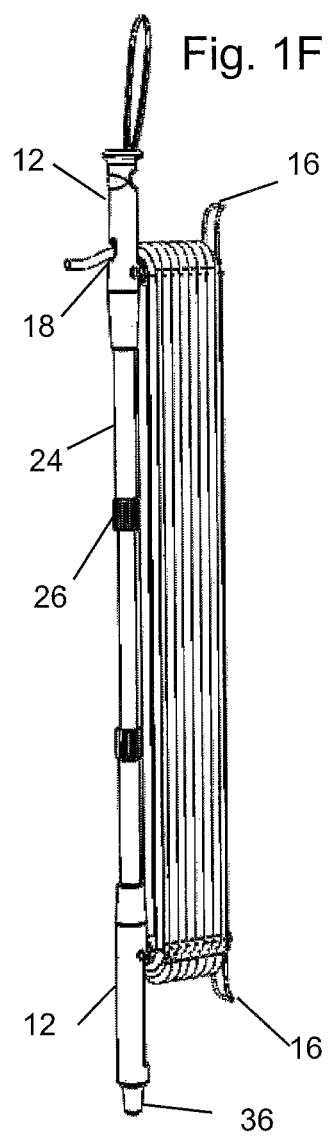

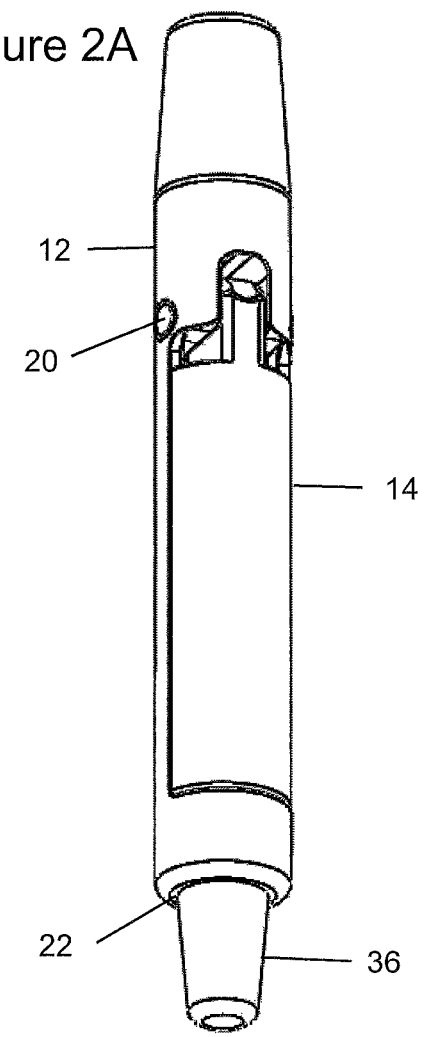

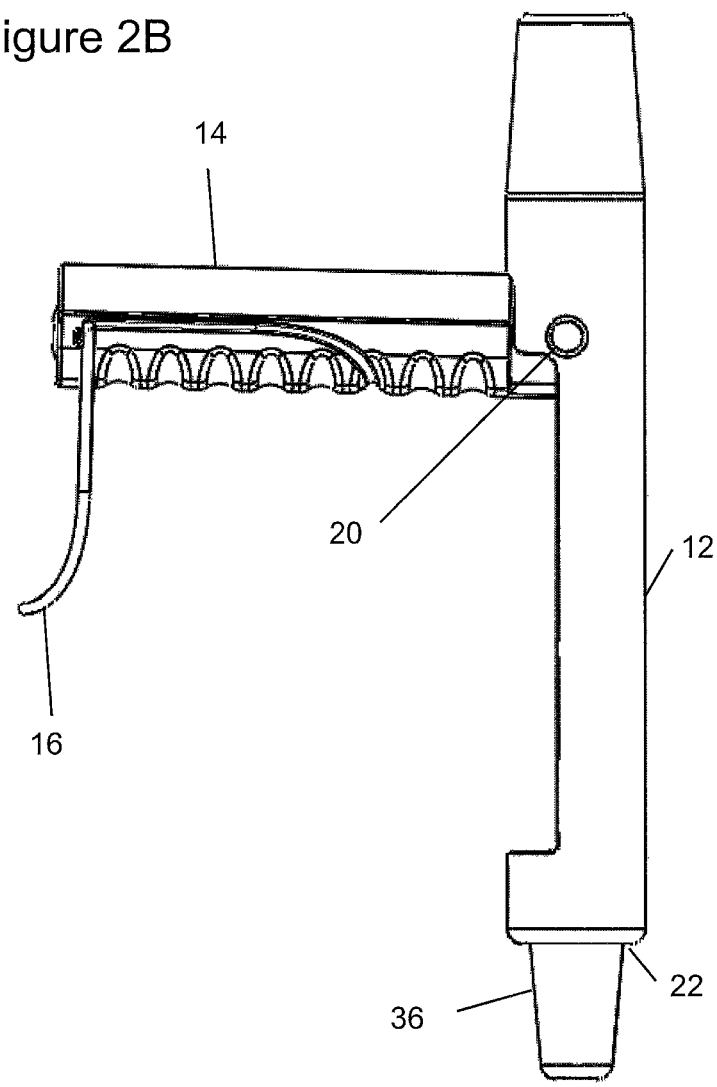

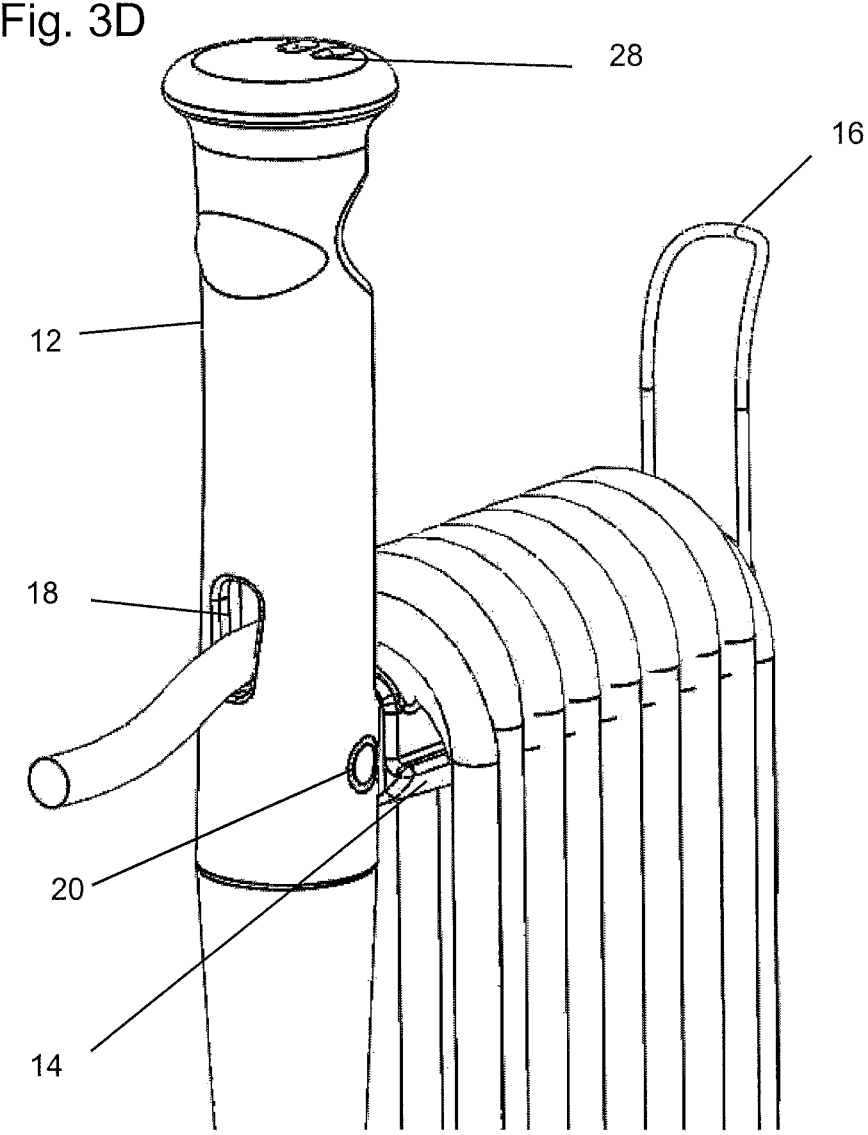

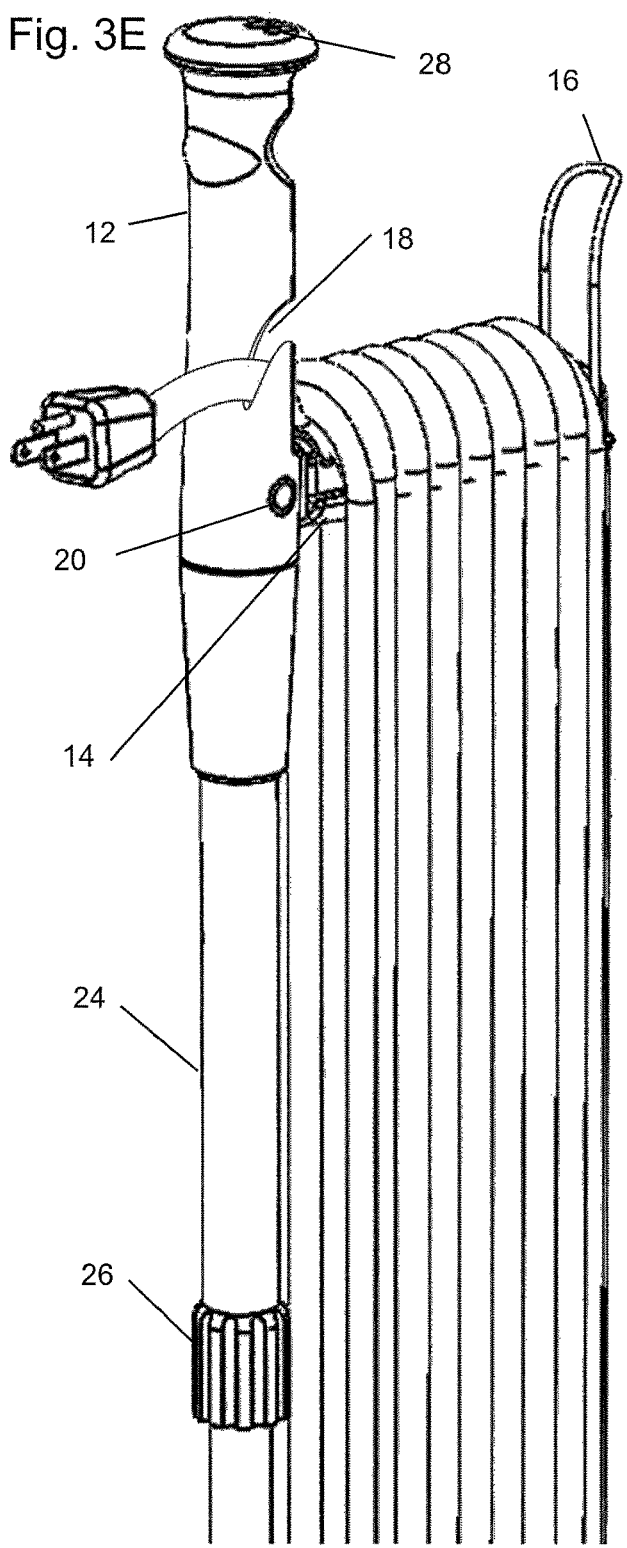

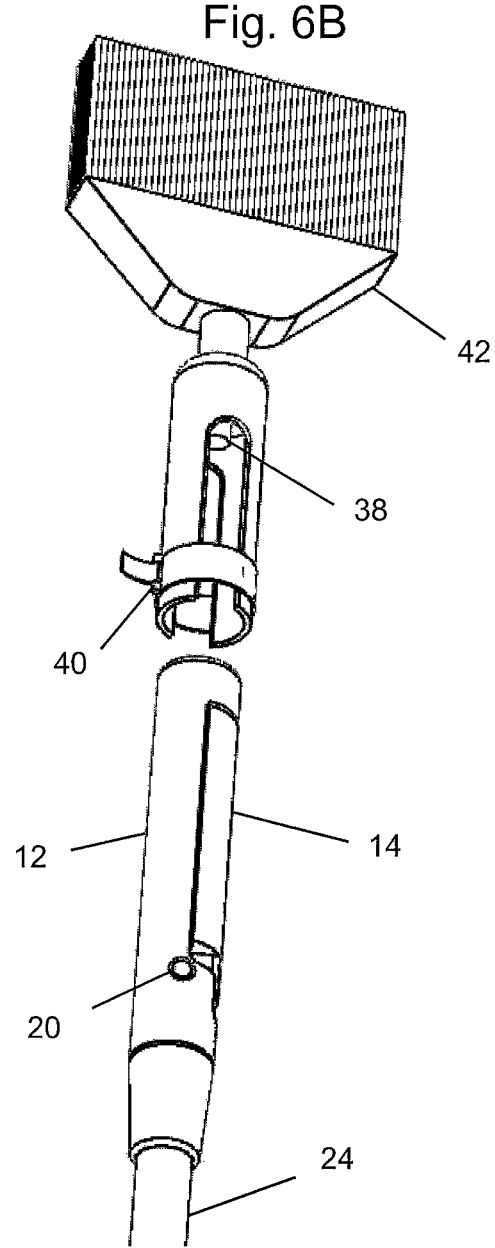

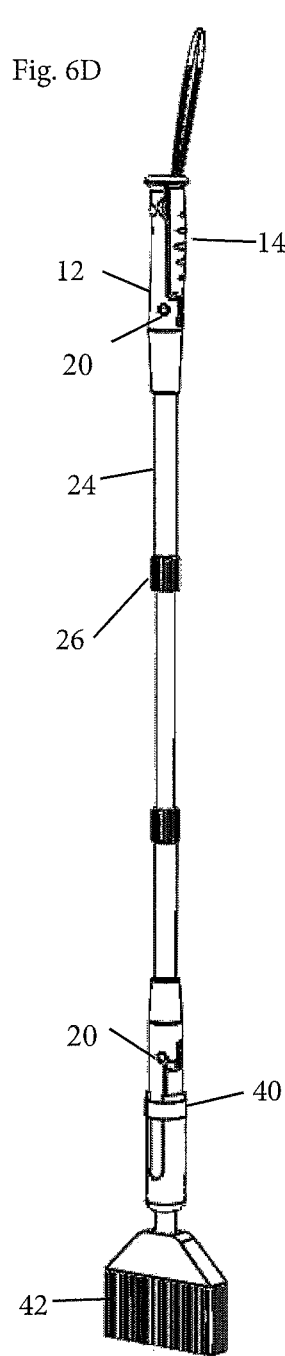

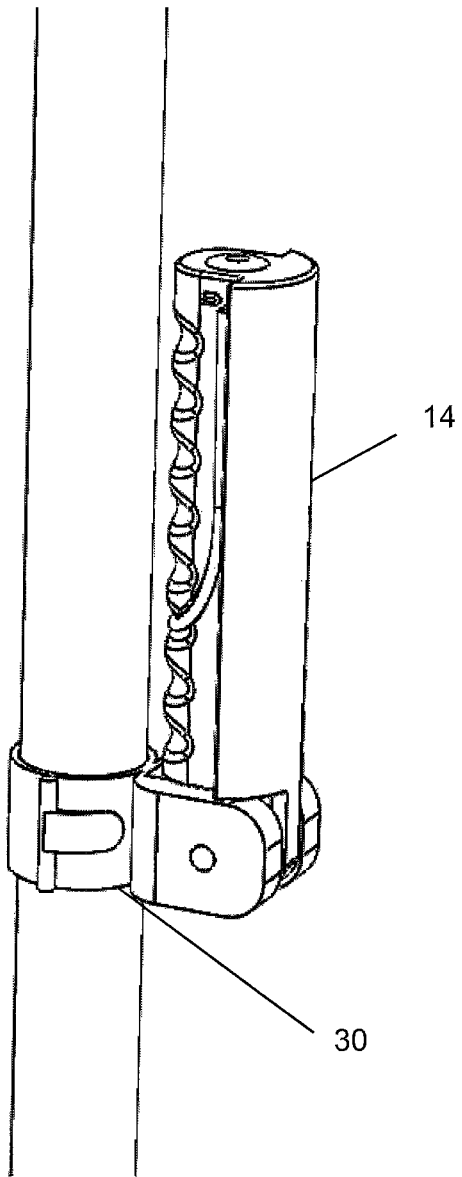

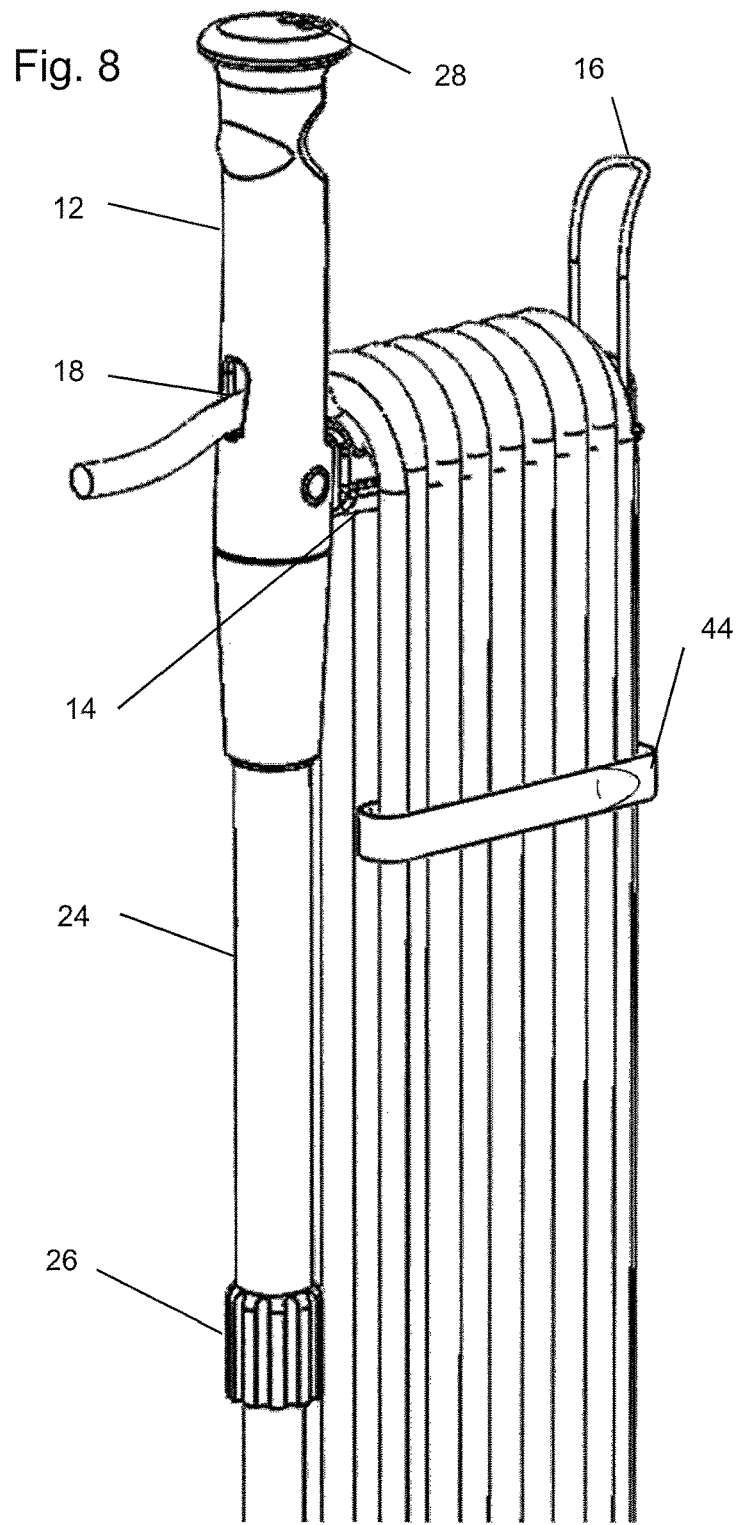

COIL PRO

CROSS-REFERENCE TO RELATED APPLICATIONS

This application claims the benefit of Provisional Patent Application Ser. No. 62/217,930, originally filed on Sep. 13, 2015, and additional filings under the same Provisional Patent Application Ser. No. 62/217,930 filed on Dec. 21, 2015, Mar. 13, 2016, and May 19, 2016.

BACKGROUND

1. Field of the Invention

An embodiment described herein relates to a device used for coiling a rope or other materials. Herein below specific references will be made to staffs used with rock climbing for simplicity of description without any limitation to such use.

2. Background Information

Some devices for rock climbing have been in use to attempt to assist participants in the sport with various chores and functions involved. There are numerous problems with tools in use thus far, and, among other issues, there is a great need for a transportable device that allows ropes to be coiled effectively. The benefits of an embodiment described herein are not limited to rock climbing or outdoors sports, however. With many people preferring multi-purpose tools in numerous activities, an embodiment described herein may be used in other settings as well.

SUMMARY

In accordance with a description of an embodiment herein, a coiling device on which a rope, extension cord, or other materials may be coiled and allows for additional tools to be included and/or coupled to it to serve numerous other functions. Such a coiling device may be coupled to a pole, whether telescopic or otherwise. In another embodiment, a coiling device, or any portion thereof, can couple to a pole via a clamp.

BRIEF DESCRIPTION OF DRAWINGS

Other characteristics and advantages of some embodiments described herein will become apparent from the following description, given by way of non-limiting examples, with reference to the annexed drawings, in which:

FIGS. 1A to 1H show a 24 shaft and a 26 shaft lock.

FIGS. 2A to 2B show a 10 coil guide coupled with a 36 tip attachment.

FIG. 6A to 6D show a 42 broom head attachment that may be coupled to an 22 end attachment via a 38 internal attachment mechanism and around a 10 coil guide via an 40 external attaching mechanism.

FIG. 8 shows a rope coiled around a 10 coil guide with a 44 coil strap coupled to and wrapped around a rope.

Figure 1E:
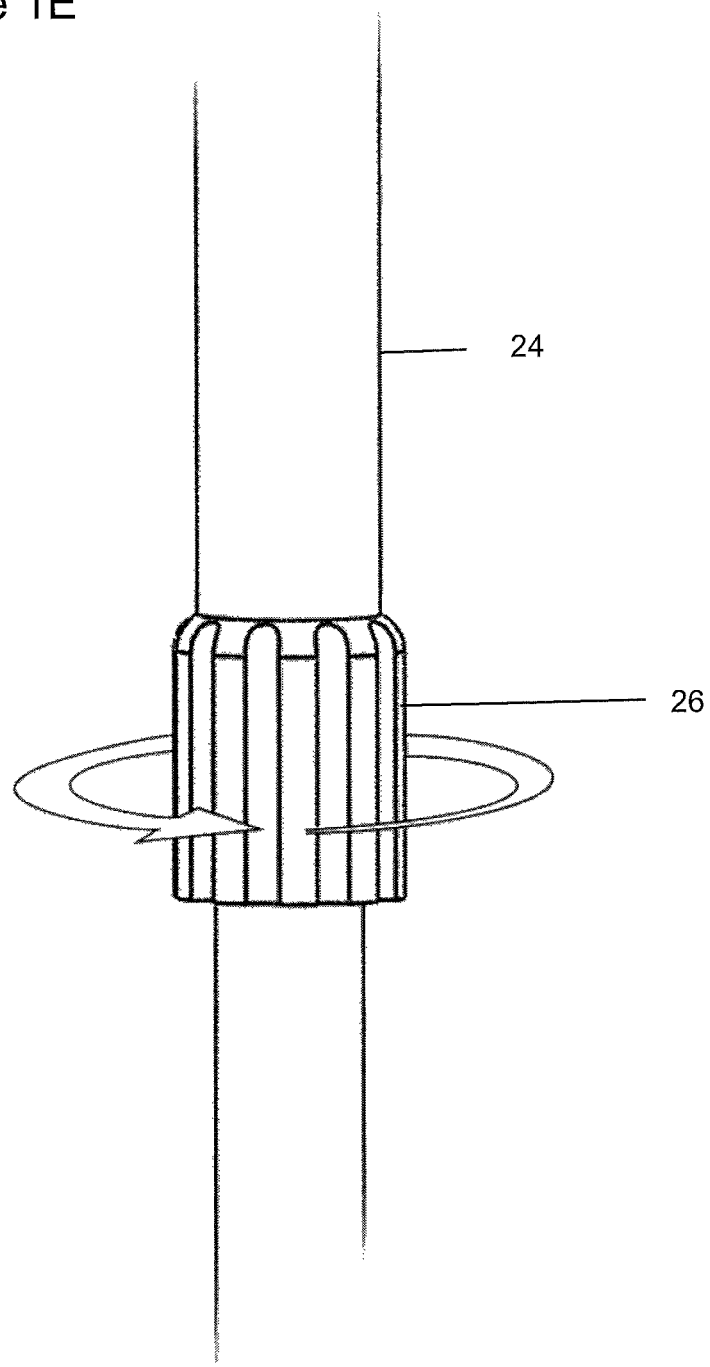

| REFERENCE NUMERALS OF DRAWINGS | |
|---|---|
| 10 coil guide | 12 cover of coil guide |
| 14 body of coil guide | 16 stopper of coil guide |
| 18 rope pinch | 20 hinge |
| 22 end attachment | 24 shaft |
| 26 shaft lock | 28 strap attachment |
| 30 coil guide clamp | 32 quickdraw setter/remover attachment |
| 34 brush attachment | 36 tip attachment |
| 38 internal attaching mechanism | 40 external attaching mechanism |
| 42 broom head attachment | 44 coil strap |

DETAILED DESCRIPTION

In some embodiments, a 24 shaft may comprise a rod and/or staff, which may comprise a top end and a bottom end. An embodiment of a telescopic 24 shaft is illustrated by way of non-limiting examples in FIGS. 1A to 1H. Although a 24 shaft is not required to be telescopic, telescopic capabilities may help with transporting and/or storing some embodiments of a 24 shaft in certain circumstances. In some embodiments, a 24 shaft may be comprised of aluminum. Some embodiments of a telescopic 24 shaft may comprise one or more interconnected pole segments, with such telescopic 24 shaft comprising a top end and a bottom end. Alternatively, other embodiments of a 24 shaft, whether telescopic or otherwise, may be comprised of any material, including but not limited to any metallic material, plastic and/or any various plasticized materials, fiberglass, any material that may be comprised of any proportion of carbon fiber-based material, wood, rubber, vinyl, and/or any variation and/or combination of these or any materials.

In some embodiments where a 24 shaft is configured to be telescopic, its length may be altered to various lengths as illustrated by way of non-limiting examples in FIGS. 1A to 1D. In some embodiments where a 24 shaft is configured to be telescopic, it may comprise any number of pole segments, some of which may be narrower in diameter or width than other pole segments such that pole segments with a narrower diameter or width may be able to fit inside pole segments with a wider diameter or width. The diameter or width of each pole segment in a 24 shaft may be progressively smaller from one end of the shaft to another or, alternatively, may not be progressively smaller from one end of a 24 shaft to another.

Some embodiments of a 24 shaft may comprise three pole segments that are cylinder-shaped and 16 inches in length with the widest pole segment having a 0.5 inch diameter from one outer edge of an exterior wall to another and with that segment being on the top, with the next segment having a 0.4 inch diameter from one outer edge of an exterior wall to another and with that segment being in the middle, and the last segment having a 0.3 diameter from one outer edge of an exterior wall to another and with that segment being on the bottom, and all such pole segments of a 24 shaft may have an exterior wall with a thickness of 0.05 inches. Alternatively, some embodiments may be comprised of any number of pole segments in a 24 shaft, such pole segments may have different lengths, be comprised of different shapes, and/or such pole segments may have different thicknesses of an exterior wall. Some embodiments may not require pole segments of a 24 shaft to be uniform in any dimension and/or composition of materials in comparison with any other such pole segment(s) of the same 24 shaft. Some embodiments may be comprised of one pole with any dimension of length and/or thickness of exterior wall. Some embodiments of a 24 shaft may be hollow, partially filled in internally, and/or completely filled in internally. An embodiment that is a shape other than circular or cylindrical may comprise a width as opposed to a diameter. In some embodiments, a 24 shaft, whether telescopic or not, may comprise any descriptions, dimensions, sizes, materials, shapes, and/or quantities of components.

In some embodiments with a telescopic 24 shaft, adjusting the length of such telescopic 24 shaft may be performed by unlocking a 26 shaft lock that, when locked, holds any various pole segments of a 24 shaft in place relative to one another along the shaft. A 26 shaft lock may be locked into place with a twist lock as illustrated by way of a non-limiting example in FIG. 1E, a cam lock as illustrated by way of a non-limiting example in FIG. 1G, holes in the sides of a telescopic 24 shaft's pole segments through which button locks may fill when such buttons are not pushed down and/or depressed as illustrated by way of a non-limiting example in FIG. 1H, and/or through any other means by which pole segments may be held together.

Some embodiments of a twist lock may be placed in a "locked" position by twisting an outside component in a particular direction as signified, by way of a non-limiting example, with the arrow in FIG. 1E. Twisting in the opposite direction may result in moving such twist lock into an "unlocked" position so that the length of a telescopic 24 shaft may be adjusted.

Figure 1G:
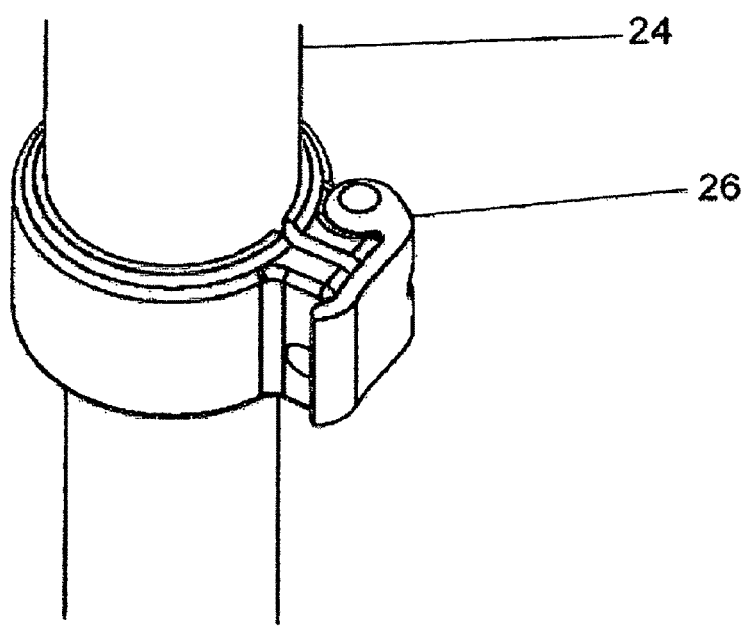

Some embodiments of a cam lock may be placed in a "locked" position by pushing a lever lock towards a 24 shaft as illustrated by way of a non-limiting example in FIG. 1G. Pulling a lever lock away from a 24 shaft may result in moving such cam lock into an "unlocked" position such that the length of a telescopic 24 shaft may be adjusted.

Figure 1H:
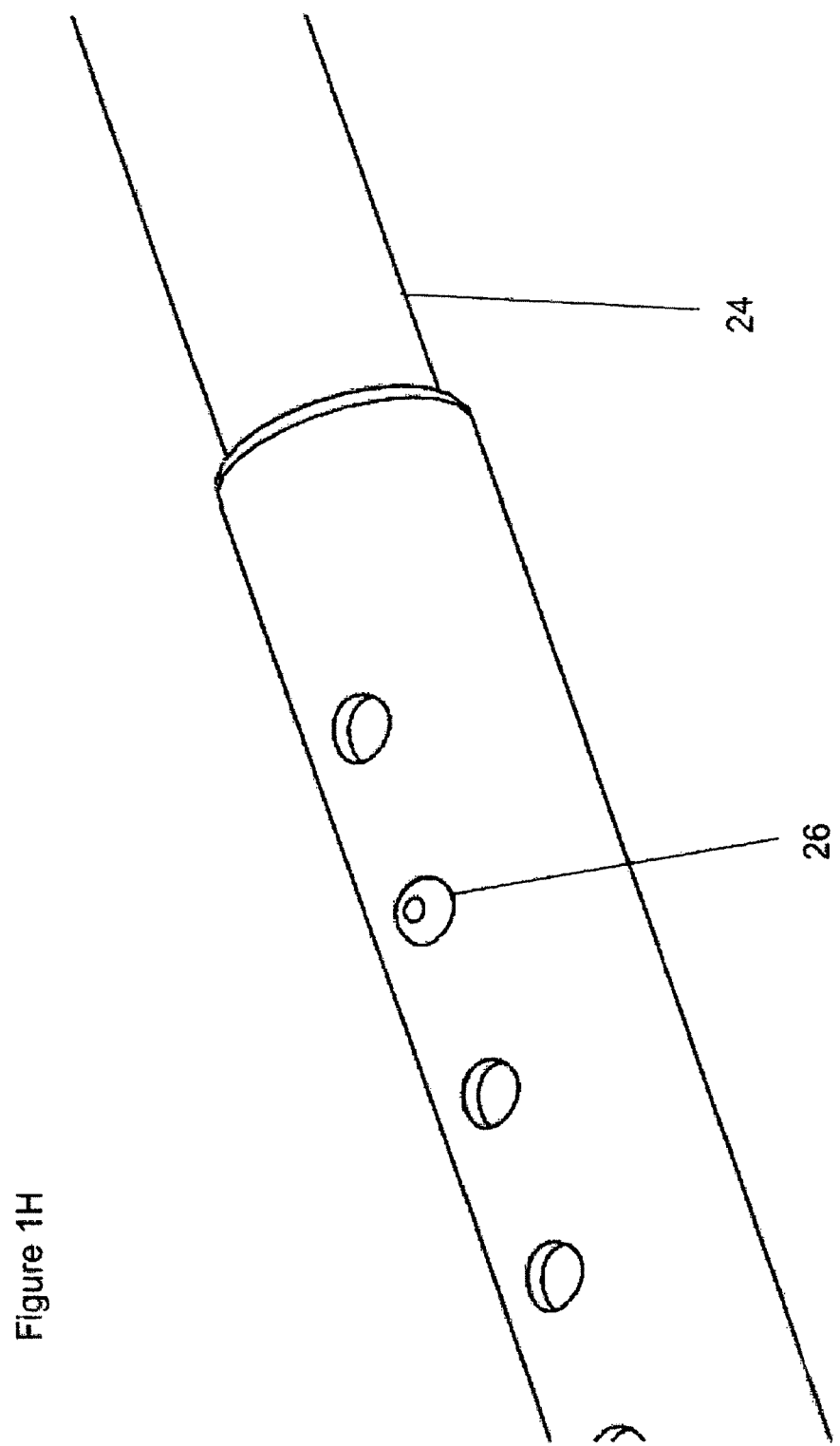

Some embodiments of a button lock for a telescopic 24 shaft may be comprised of a bolt, internal spring-loaded button as illustrated by way of a non-limiting example in FIG. 1H, and/or any other device, material, and/or substance that may be inserted and/or protrude from one pole segment to fill a hole on another pole segment of a 24 shaft thereby locking the applicable pole segment in that location relative to one or more other pole segments. To "unlock" a button lock one should push such protruding button, and/or any other device, material, and/or substance into a depressed position inside of the hole and slide a pole segment further inside and/or outside of another pole segment.

Some embodiments of a 26 shaft lock may comprise a twist lock that is comprised of plastic with threading that allows said twist lock to be tightened and/or loosened when the same is twisted upon such threads. Alternatively, some embodiments of a 26 shaft lock, whether a twist lock or otherwise, may be comprised of any metallic material, aluminum, plastic, various plasticized materials, fiberglass, any material which may be comprised of wholly and/or any proportion of carbon fiber-based material, wood, rubber, vinyl, and/or any variation and/or combination of these and/or any materials. Some embodiments of a 26 shaft lock may be comprised of any shape, size, and/or dimension.

Figure 3A:
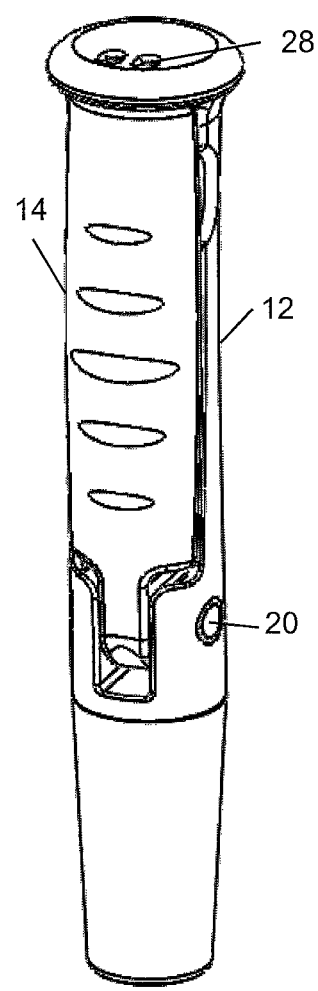
FIGS. 3A to 3C show a 10 coil guide with 3D showing a rope in a 18 rope pinch and coiled around a 14 body of coil guide and 3E showing an extension cord in another embodiment of a 18 rope pinch and coiled around a 14 body of coil guide.

A 10 coil guide may be configured to comprise a case inside of which all, part, and/or none of a member may fit, abut against, and/or come close to. From the previous sentence, such case may be comprised of 12 cover of coil guide and/or such member may be comprised of a 14 body of coil guide. FIG. 1D illustrates by way of a non-limiting example 10 coil guides that are opened on a 24 shaft. In some embodiments, a 10 coil guide may comprise a 12 cover of coil guide configured to be coupled to a 14 body of coil guide by a movable coupling, and/or a 16 stopper of coil guide configured to be coupled to a 14 body of coil guide. FIG. 3D illustrates by way of a non-limiting example a rope held in a 18 rope pinch and an open 10 coil guide with a rope coiled around it. FIGS. 1A to 1C illustrate by way of non-limiting examples some 10 coil guides that are closed on a 24 shaft. In some embodiments, a 10 coil guide may be coupled to a 24 shaft with screws, bolts, welding, soldering, glue, corresponding threading, and/or through any other method, device, and/or fastener, as well as any combination thereof in which two or more components may be coupled to each other. In some embodiments, a 10 coil guide may be coupled to a 24 shaft in such a way that a 10 coil guide may be removed. Alternatively, in some embodiments a 10 coil guide may be coupled to a 24 shaft permanently.

In some embodiments, FIGS. 2A to 2B may illustrate by way of non-limiting examples a bottom 10 coil guide and FIGS. 3A to 3E may illustrate by way of non-limiting examples a top coil guide. Alternatively, some embodiments may not follow the arrangement of each 10 coil guide as top or bottom as described in the previous sentence.

A bottom and/or top 10 coil guide, as illustrated by way of non-limiting examples in FIGS. 2A to 2B and FIGS. 3A to 3E, may comprise a 12 cover of coil guide, 14 body of coil guide, and/or 20 hinge, other fastener, and/or movable coupling. In some embodiments, a 10 coil guide may be comprised of plastic and/or have a compass coupled to it. In some embodiments, a 12 cover of coil guide may be comprised of plastic and/or a 14 body of coil guide may be comprised of plastic. By way of a non-limiting example, such plastic in a 12 cover of coil guide may be 0.125 inches thick and comprise a shape of a half cylinder for 7 inches away from where such 12 cover of coil guide couples to a 24 shaft. In some embodiments, an end of a 12 cover of coil guide may be comprised of a full circle shape as illustrated by way of a non-limiting example in FIGS. 3A to 3E. Such full circle may be permanently coupled to a half cylinder shaft of a 12 cover of coil guide, or alternatively such full circle may be removable.

In some embodiments, a 14 body of coil guide may be comprised of plastic that is solid or hollowed out such that an outer wall of plastic on a 14 body of coil guide has a thickness of 0.125 inches. In some embodiments, a 14 body of coil guide may be 6 inches long with a circular shape and/or have some sides that are rounded. A diameter of a 14 body of coil guide with a cylindrical and/or circular shape, or width if comprised of a shape other than a cylindrical and/or circular shape, may be 1.25 inches. All, part of, or none of a 14 body of coil guide may fit inside of a 12 cover of coil guide. In some embodiments where any portion of a 14 body of coil guide fits inside of and/or abuts against and/or comes close to a 12 cover of coil guide, the shape and/or dimensions of a 12 cover of coil guide and/or 14 body of coil guide may correspond to allow such.

Alternatively, in some embodiments a 10 coil guide and/or any 12 cover of coil guide and/or 14 body of coil guide may be comprised of various plasticized materials, fiberglass, any material which may be comprised of any proportion of carbon fiber-based material, any metallic material, aluminum, wood, rubber, vinyl, or any variation or combination of these or other materials. Some embodiments of a 10 coil guide and/or any 12 cover of coil guide and/or 14 body of coil guide may also be comprised of different shapes, sizes, dimensions, thicknesses, and/or portions of thickness. In some embodiments, no portion of a 14 body of coil guide may be able to fit inside of a 12 cover of coil guide.

Figure 3B:
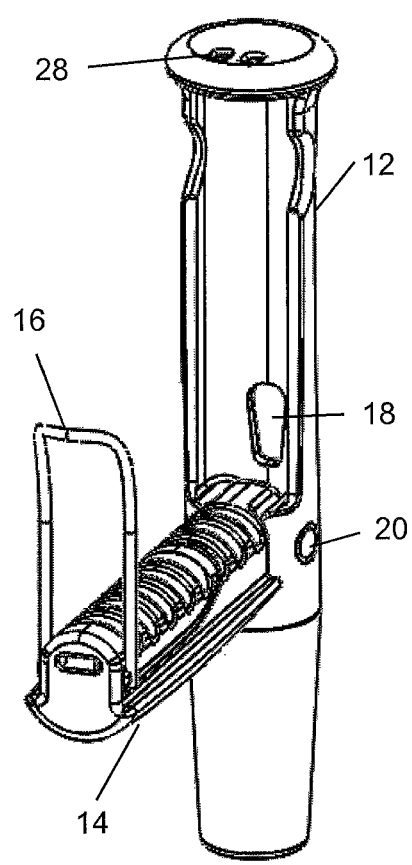
Figure 3C:
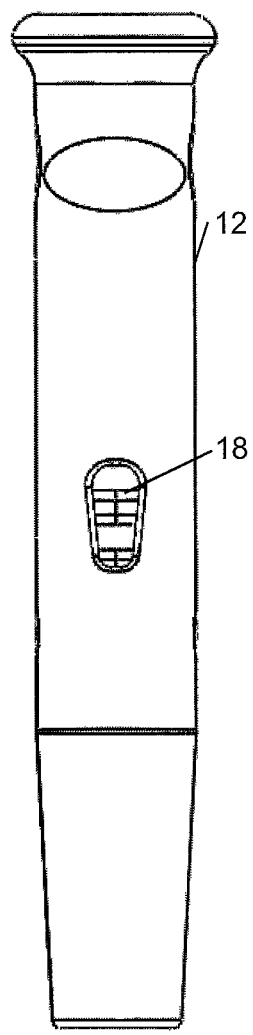

In some embodiments, a 14 body of coil guide may comprise grooves as illustrated by way of non-limiting examples in FIGS. 1D, 2B, and 3B which may hold in place a portion of a rope, extension cord, or other material being coiled as it touches the 14 body of coil guide during the coiling process. Alternatively, some embodiments of a 14 body of coil guide may not comprise such grooves, and/or be smooth and/or comprised of other shapes and/or textures.

In some embodiments, a 14 body of coil guide and/or 12 cover of coil guide may comprise one or more corresponding bumps and holes, such that a bump on one such component fits into a hole on the opposite component, to allow a 14 body of coil guide to hold in place in various positions when so coupled with a 12 cover of coil guide. Alternatively, in some embodiments such bumps and/or holes may be absent.

In some embodiments, a 20 hinge, other fastener, and/or movable coupling may hold a 14 body of coil guide to a 12 cover of coil guide. In some embodiments where a 14 body of coil guide is coupled to a 12 cover of coil guide via a 20 hinge, other fastener, and/or movable coupling, a 14 body of coil guide may rotate on such 20 hinge, other fastener, and/or movable coupling to open as illustrated by way of non-limiting examples in FIGS. 2B and 3B and close as illustrated by way of non-limiting examples in FIGS. 2A and 3A.

Figure 7A:
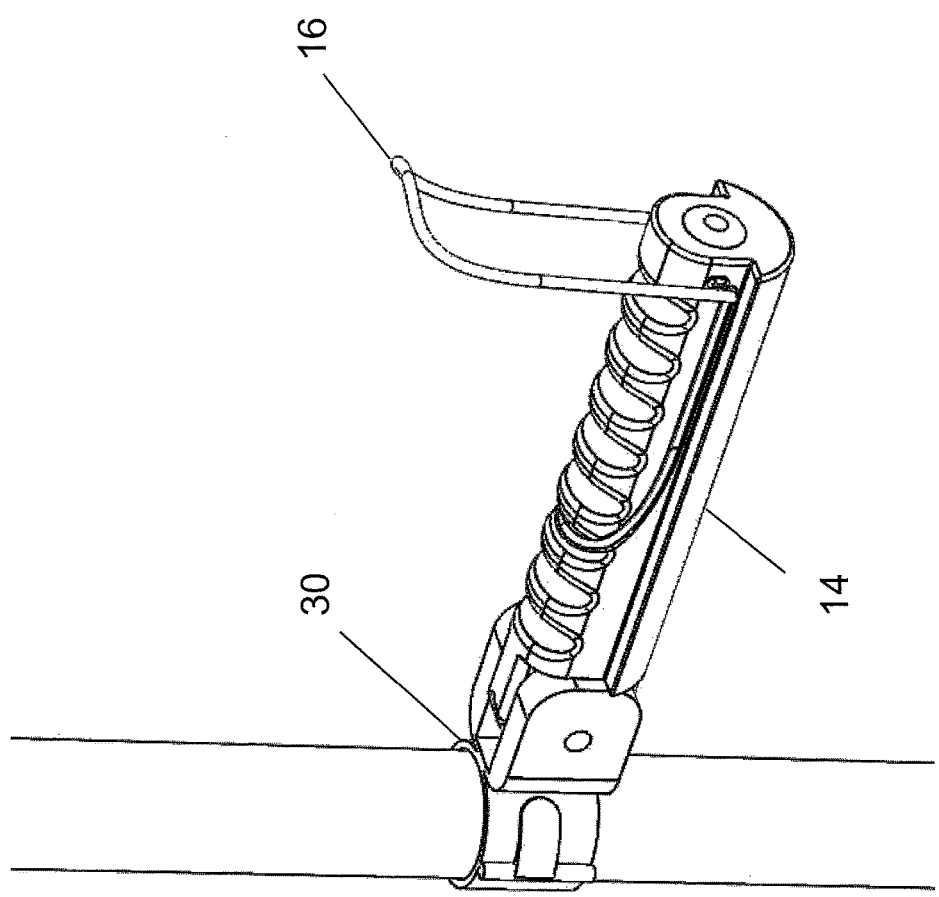
FIGS. 7A to 7E show a 30 coil guide clamp coupled to a 14 body of coil guide, which is coupled to a 16 stopper of coil guide as shown in FIG. 7F.
Figure 7C:
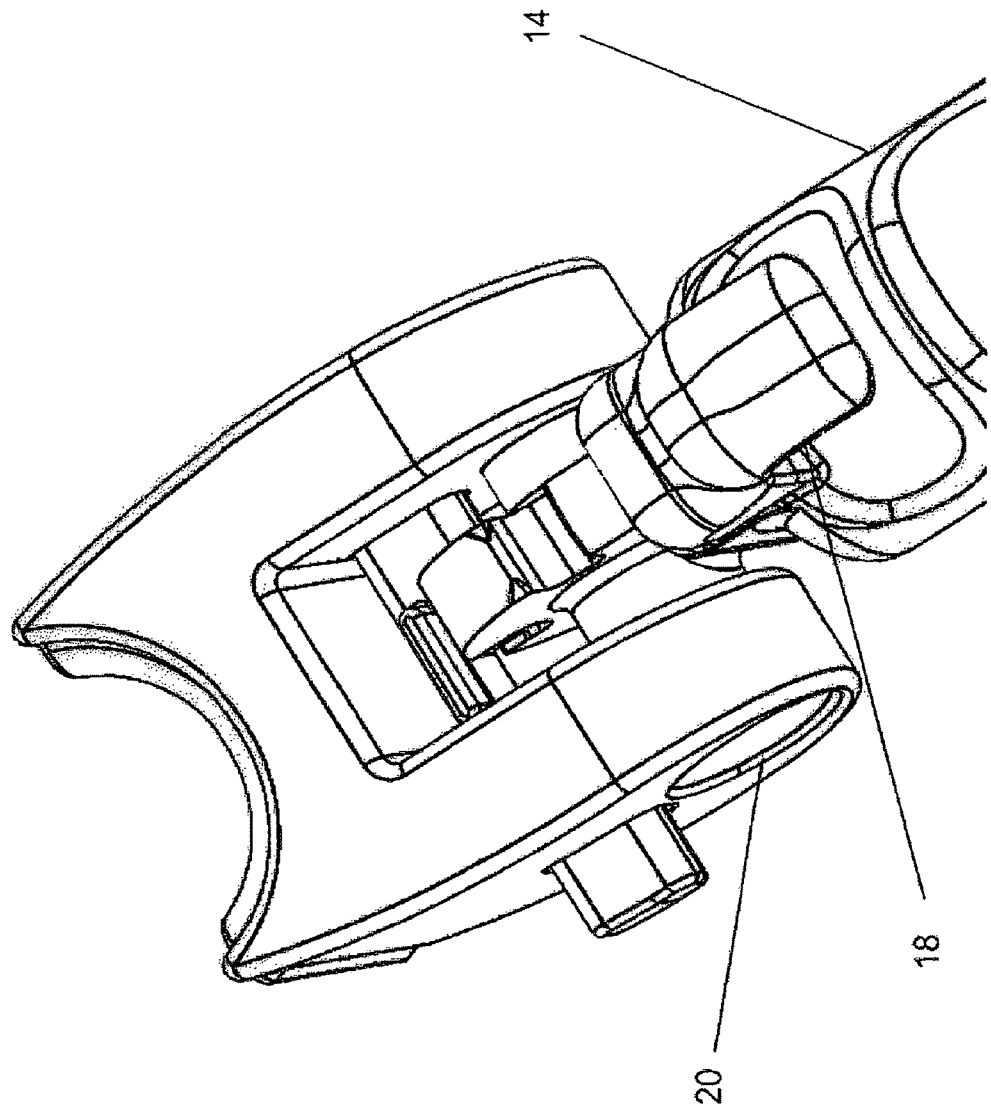
Figure 7D:
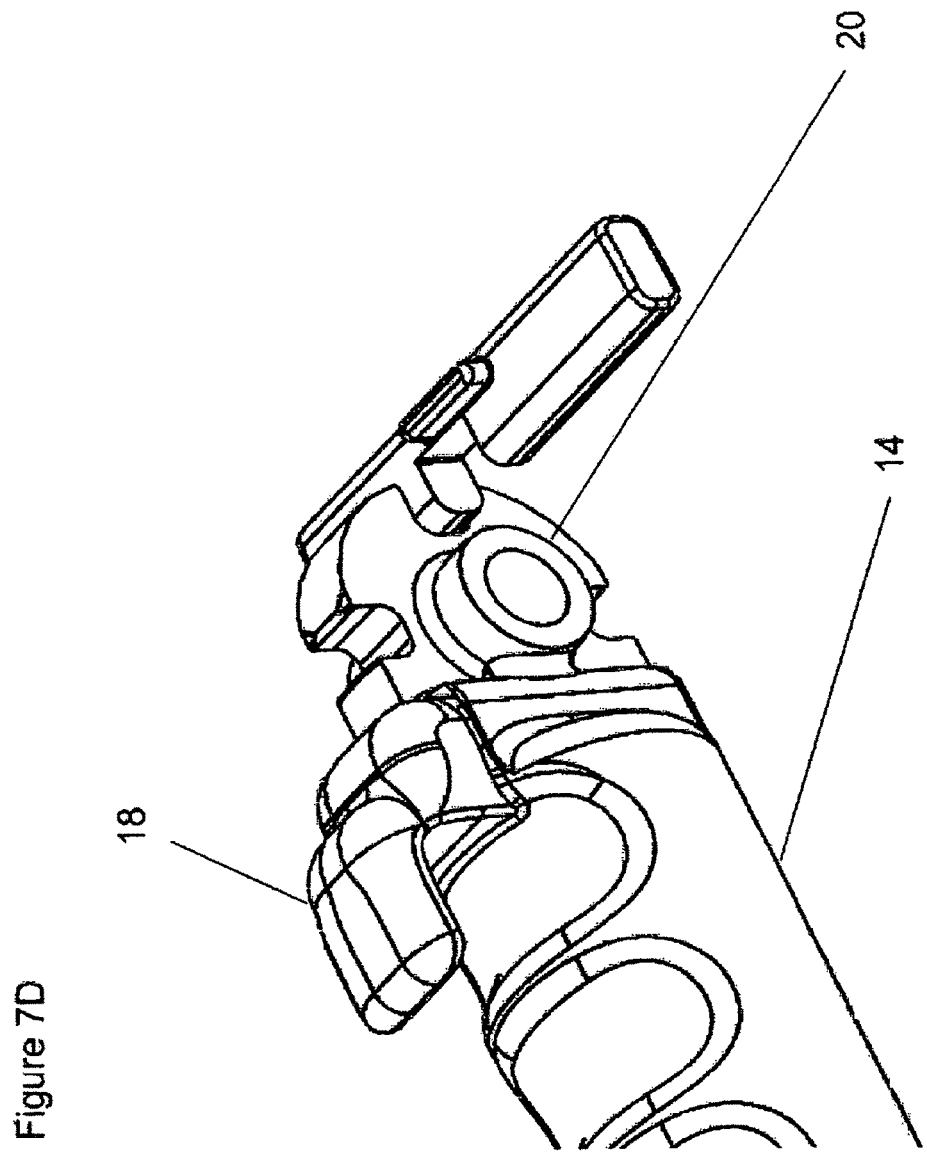
Figure 7E:
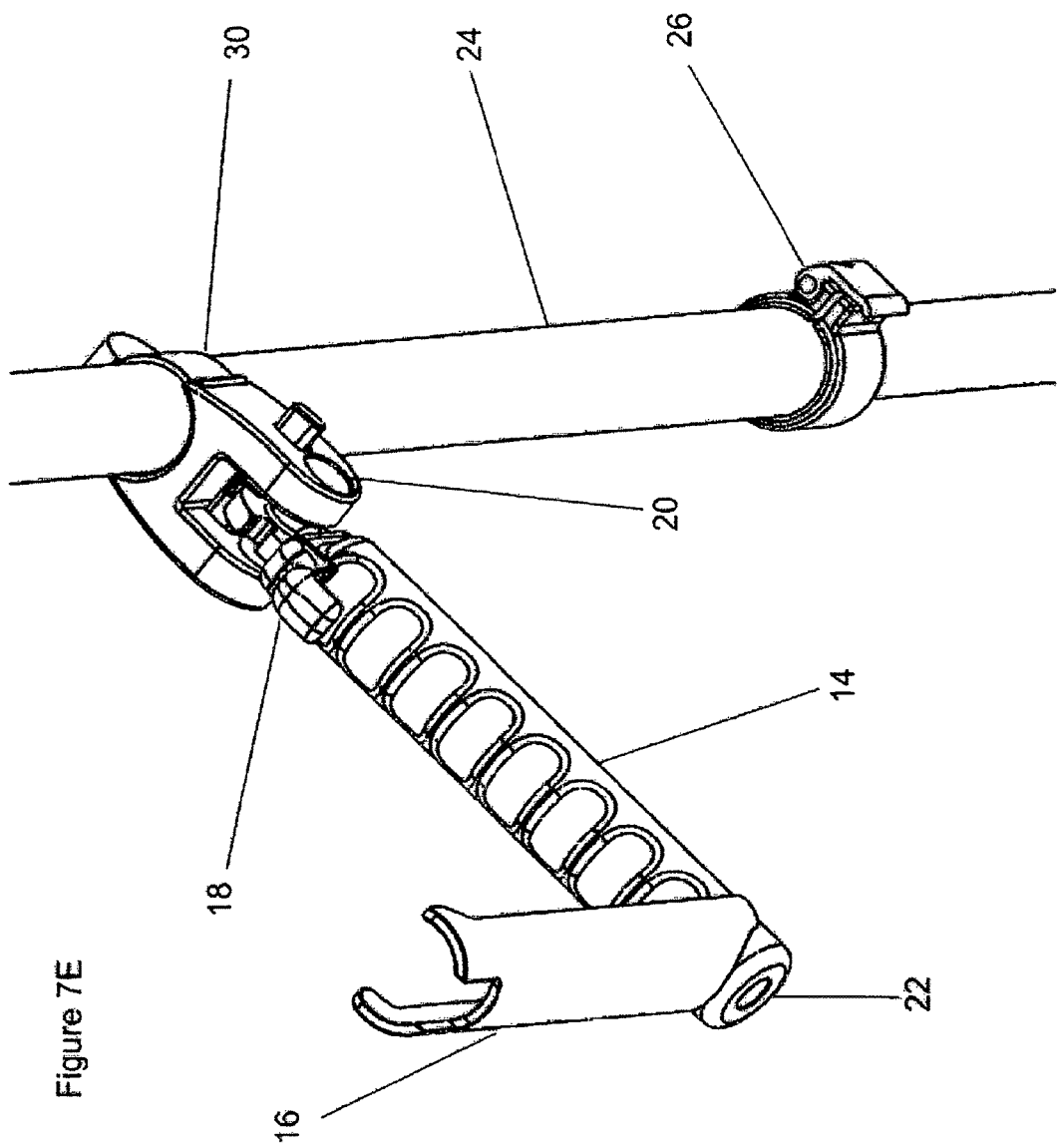
Figure 7F:
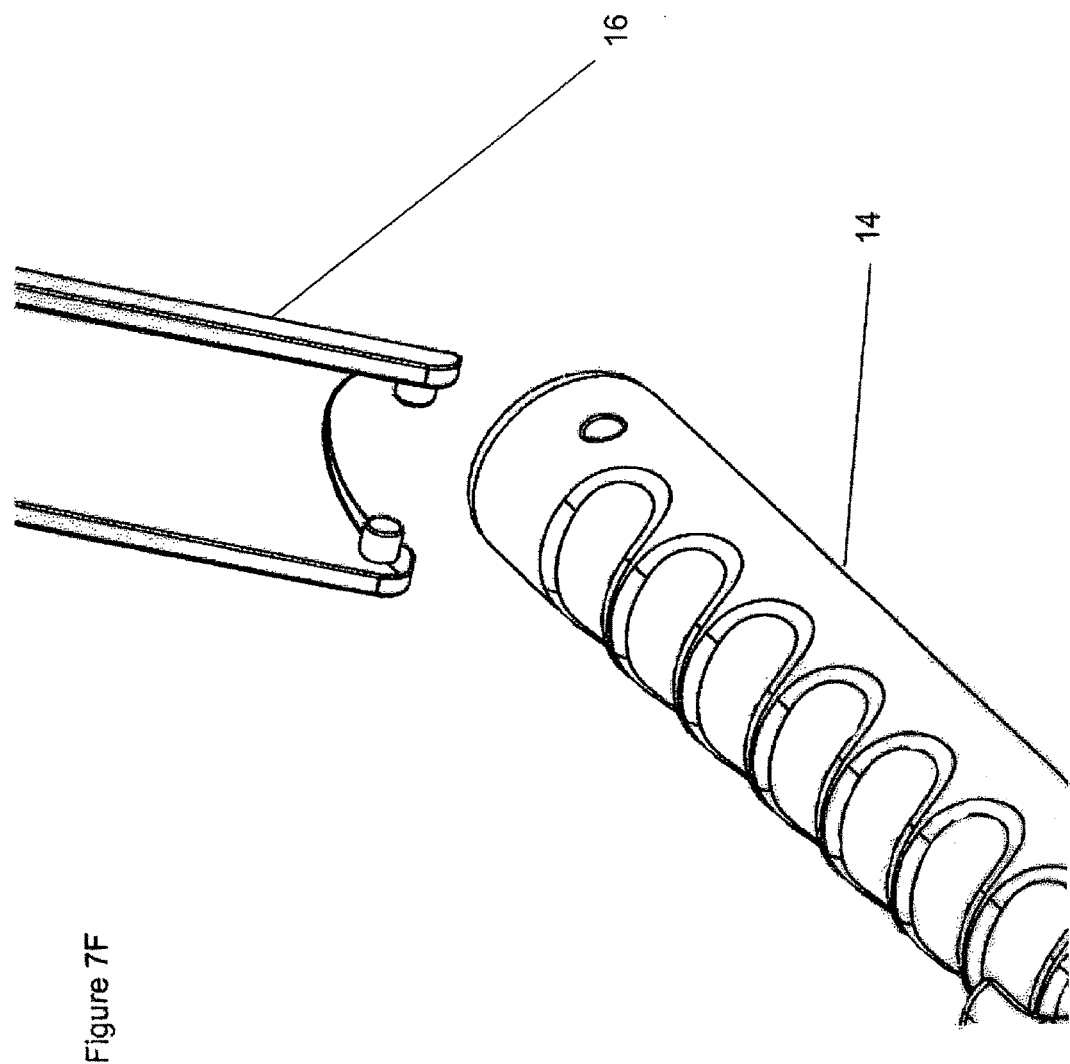

In some embodiments, a 20 hinge, other fastener, and/or movable coupling may lock out in an open position of any degree or varying degrees, and/or lock in a closed position such that it requires additional effort to adjust such 20 hinge, other fastener, and/or movable coupling from be locked position to any other position. FIGS. 7C to 7E illustrate by way of non-limiting examples an embodiment that comprises a 20 hinge that is configured to lock in place in one or more positions. Alternatively, in some embodiments such locking of a 20 hinge, other fastener, and/or movable coupling may possibly not be a function such that a 20 hinge, other fastener, and/or movable coupling may also rotate, requiring no additional effort to adjust the angle in which a 20 hinge, other fastener, and/or movable coupling is opened and/or closed.

In some embodiments, a 20 hinge, other fastener, and/or movable coupling may be comprised of plastic and/or metal components. Alternatively, some embodiments of a 20 hinge, other fastener, and/or movable coupling may be comprised of plastic and/or any various plasticized materials, fiberglass, any material which may be comprised of any proportion of carbon fiber-based material, any metallic material, metal, aluminum, wood, rubber, vinyl, and/or any variation and/or combination of these and/or other materials. In some embodiments, a 20 hinge, other fastener, and/or movable coupling may be comprised of any size, shape, and/or dimension.

In some embodiments, a 20 hinge, other fastener, and/or movable coupling may be coupled to a 14 body of coil guide and/or a 12 cover of coil guide with screws, bolts, welding, soldering, glue, corresponding threading, and/or any other method, device, and/or fastener, as well as any combination thereof and/or also shaped as one piece in a mold. Alternatively, in some embodiments a 20 hinge, other fastener, and/or movable coupling may couple a 14 body of coil guide to a 12 cover of coil guide, and/or couple any other components, in any manner in which two and/or more components may be coupled.

In some embodiments, a 10 coil guide may comprise a 16 stopper of coil guide as illustrated by way of non-limiting examples in FIGS. 1D, 2B, and 3B. Some embodiments of a 16 stopper of coil guide may be illustrated by way of non-limiting example in FIGS. 7E and 7. In some embodiments, a 16 stopper of coil guide may comprise one or more arms wherein a 16 stopper of coil guide couples with a 14 body of coil guide by a movable coupling, a bridge coupling one or more such arms, and/or one or more such arms that abut against and/or come close to a brake bump protruding on a 14 body of coil guide which may limit the range of rotation of such 16 stopper of coil guide. In some embodiments, a 16 stopper of coil guide may be comprised of aluminum or any metallic material and/or be coupled to an end of a 14 body of coil guide that is opposite to an end of a 14 body of coil guide that is proximal to a 12 cover of coil guide. A 16 stopper of coil guide may have a thickness of 0.125 inches and comprise a loop shape having an apex of such loop being 3 inches from the ends of the looped material. Alternatively, in some embodiments a 16 stopper of coil guide may be comprised of any material including but not limited to any various plasticized materials, fiberglass, any metal and/or metallic material, any material which may be comprised of any proportion of carbon fiber-based material, wood, rubber, vinyl, and/or any variation and/or combination of these and/or other materials, and/or may couple elsewhere on a 14 body of coil guide and/or other component of an embodiment contemplated herein. In some embodiments, a 16 stopper of coil guide may be comprised of other structures, shapes, sizes, and/or dimensions. In some embodiments, a 16 stopper of coil guide may couple to a 14 body of coil guide by other means and/or may interact with a brake bump in other manners or not at all. In some embodiments, a brake bump may be absent.

In some embodiments, a 16 stopper of coil guide may rotate up and/or down, so as to abut against and/or come close to a 14 body of coil guide. In some embodiments, a 16 stopper of coil guide may help prevent whatever material is being coiled on 10 coil guides, whether rope, extension cords, or any other materials, from falling off the end of a 14 body of coil guide during and/or after the coiling process. In some embodiments, a 16 stopper of coil guide may lock in an open position of any degree or number of varying degrees and/or lock in a closed position such that it requires additional effort to adjust the position of such 16 stopper of coil guide. Alternatively, in some embodiments a 16 stopper of coil guide may have no locking mechanism such that it rotates throughout its entire permitted range of motion without requiring any additional effort to rotate past a given point that is permitted by such embodiment.

In some embodiments, a bottom and/or a top 10 coil guide and/or 24 shaft may function as a handle so the exterior of such one or more 10 coil guides and/or 24 shaft may comprise a shape that may allow it to serve as a handle, including but not limited to comprising recesses for all of or portions of a hand, one or more finger, and/or a thumb. In addition to other materials of which a 10 coil guide and/or 24 shaft may be comprised, an external portion of a 10 coil guide and/or 24 shaft that may function as a handle may also be comprised of cushioned material such as foam, neoprene, cork, and/or any other soft material as well as aluminum, any metal, any metallic material, plastic and/or any various plasticized materials, fiberglass, any material comprised of any proportion of carbon fiber-based material, wood, rubber, vinyl, and/or any variation and/or combination of these and/or any materials. Alternative embodiments of such 10 coil guide and/or 24 shaft may not function as a handle and/or such shape may be spherical, rectangular, and/or any other shape. In some embodiments, an external portion of a 10 coil guide may be comprised of tape, leather, vinyl, and/or any other material that may be coupled to and/or wrapped around any portion or all of a 10 coil guide and/or any portion or all of a 24 shaft.

In some embodiments, a bottom and/or a top 10 coil guide and/or any portion or portions of a 24 shaft may comprise a 28 strap attachment as illustrated by way of non-limiting examples in FIGS. 3A to 3B and 3D to 3E. A 28 strap attachment may comprise a cutout for a strap and/or connector to a strap to be coupled to such cutout so that a user may utilize such strap to assist in carrying and/or transporting any portion or all of an embodiment described herein. In some embodiments, such strap may be comprised of a canvas looped strap that is 0.10 inches thick, 0.6 inches wide, and 10 inches long. Alternatively, other embodiments of a 28 strap attachment may be comprised of fabric, including but not limited to canvas, vinyl, wool, cotton, nylon, leather, rope, string, cord, elastic, and/or any other fabric and/or material and/or mixture, combination, and/or variation thereof and/or may be comprised of any shape, size, dimension, description, and/or quantity.

In some embodiments, a bottom and/or a top 10 coil guide and/or any other component of an embodiment described herein may comprise a 18 rope pinch as illustrated by way of non-limiting examples in FIGS. 3B to 3D and FIGS. 7C to 7E. A rope pinch may hold in place an end of a rope, extension card, or other material being coiled so that a user may have both hands free to coil any remaining length of such rope, extension cord, or other material. FIG. 1F illustrates by way of a non-limiting example a rope held in a 18 rope pinch and coiled around 10 coil guides. In some embodiments where the primary material being coiled is a rope, a 18 rope pinch may be comprised of a cutout of a 12 cover of coil guide with two or more opposing sides that very in distance apart along the length of such sides, so that some portions of such opposing sides of a cutout are closer than other portions of such opposing sides. This may allow a user to push the end of such rope or other material towards the narrower portion of the 18 rope pinch so that the rope is held in place as illustrated by way of a non-limiting example in FIG. 3D. In some embodiments, one or more sides of such 18 rope pinch may be rounded with one side having a width of 12 millimeters and another side having a width of 8 millimeters. Alternatively, some embodiments may be comprised of a shape that is semi-circular and/or any other shape, may be comprised of any dimensions, sizes, and/or may include other pinches, clamps comprising two levers and a fulcrum (with the two levers held together similar to a clothespin with an end of each of the two levers of the clamp being held together unless pressure is exerted on the opposite end of one or more lever of the clamp) and/or other clamps, locks, and/or devices, or none of the above, to bold the end of a rope, extension cord, or other material to be coiled. Some embodiments of a 18 rope pinch may be comprised of a slit on an edge of a 12 cover of coil guide and/or any other component contemplated herein as illustrated by way of a non-limiting example in FIG. 3E such that material may fit inside the slit.

Figure 4C:
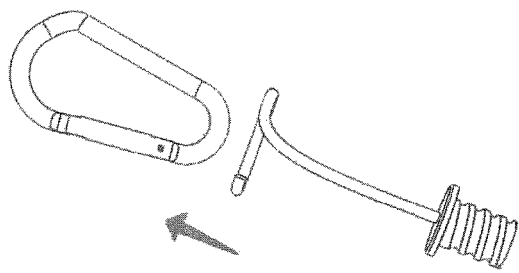
FIGS. 4A to 4E show a 32 quickdraw setter/remover attachment and how it may couple to a 22 end attachment on a 10 coil guide as well as how a 32 quickdraw setter/remover attachment may open the gate of a quickdraw's carabiner.
Figure 4E:
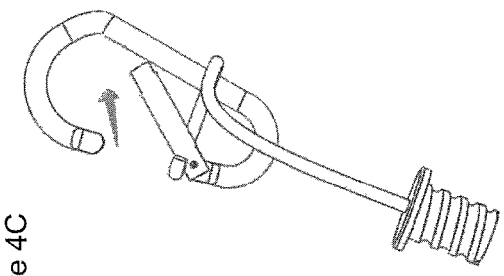
Figure 4B:
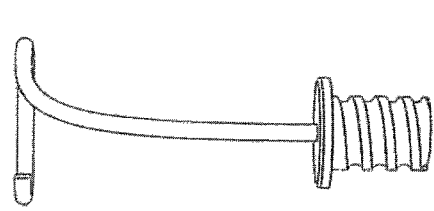
Figure 4D:
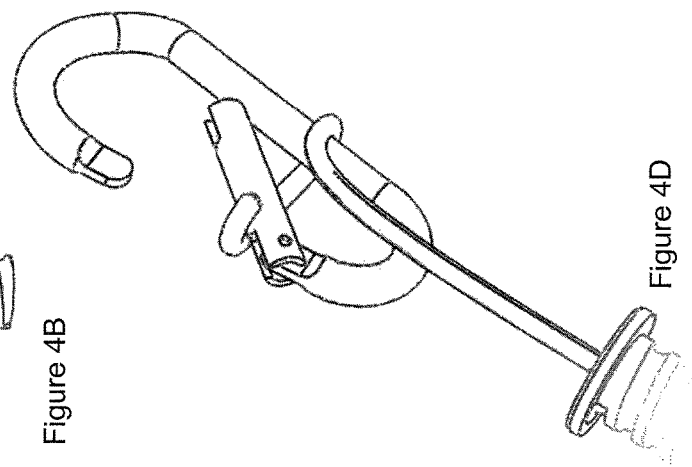
Figure 4A:
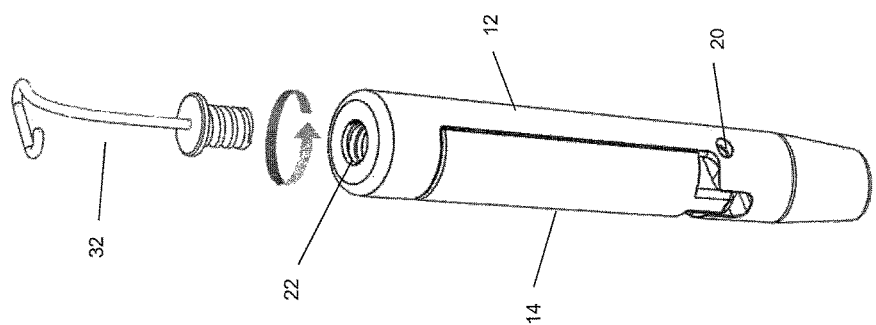
Figure 5:
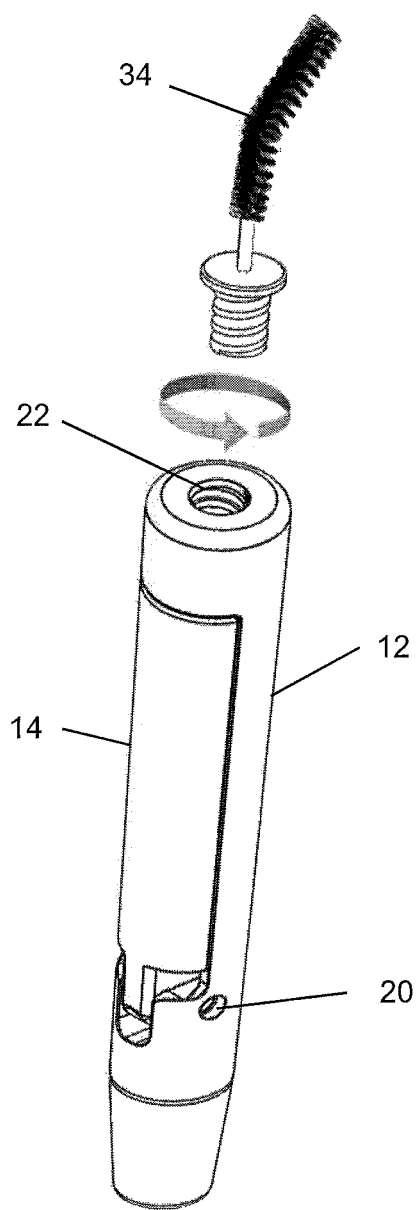
FIG. 5 shows a 34 brush attachment and how it may couple to an 22 end attachment on a 10 coil guide.
Figure 6A:
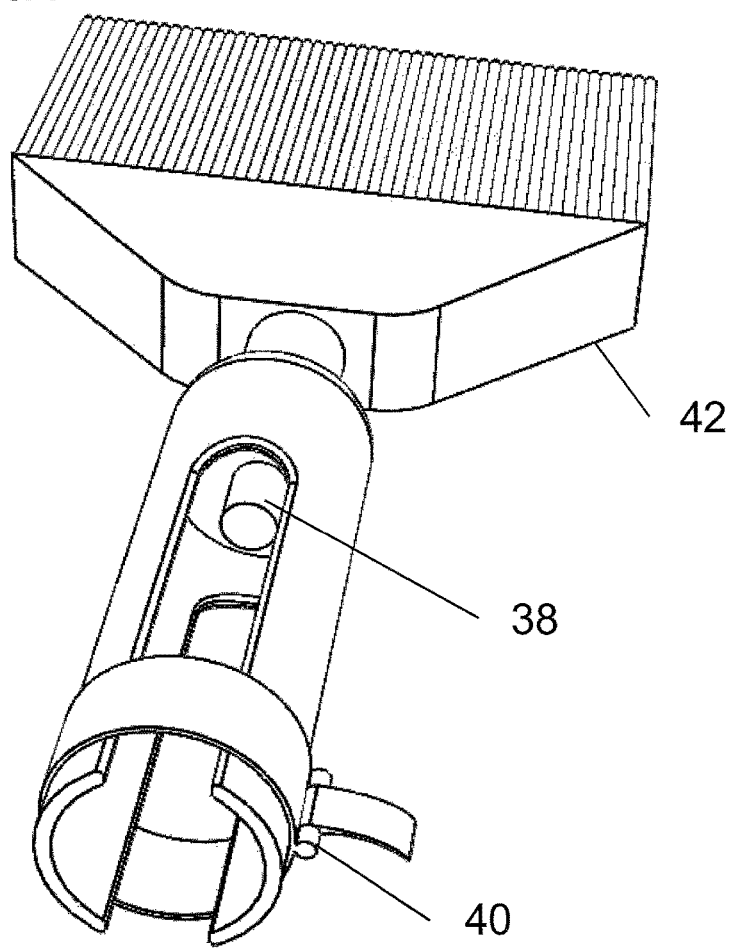
Figure 6C:
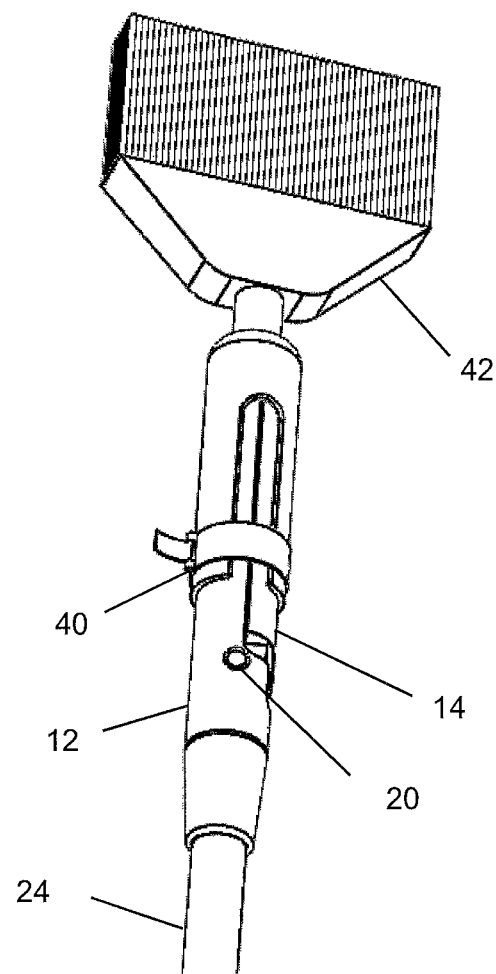

In some embodiments, a bottom and/or a top 10 coil guide may comprise an 22 end attachment as demonstrated by way of non-limiting examples in FIGS. 4A and 5. Any portion and/or component of a 10 coil guide (including but not limited to a 12 cover of coil guide, 14 body of coil guide, and/or 16 stopper of coil guide), 24 shaft, and/or any other portion and/or component of an embodiment described herein may comprise an 22 end attachment. Some embodiments may comprise only a bottom 10 coil guide that is configured to comprise an 22 end attachment, but this is by no means required as some embodiments may comprise a top 10 coil guide with an 22 end attachment, both top 10 coil guide and bottom 10 coil guide comprising an 22 end attachment, or neither top 10 coil guide nor bottom 10 coil guide comprising an 22 end attachment. Some embodiments of an 22 end attachment may be recessed such that an attachment item may protrude into an 22 end attachment in order to couple to it. In some embodiments, an 22 end attachment may comprise threading wherein corresponding threading of an attachment item fits to allow such two components to couple together. Alternatively, such 22 end attachment may allow various attachments to couple to an embodiment described herein via corresponding threading, screws, bolts, any clamp and/or locking method, system, and/or device, and/or any other device, fastener, and/or mechanism as well as any combination thereof in which two components may be coupled to each other. In some embodiments, an 22 end attachment may comprise plastic and/or metal. Alternatively, in some embodiments an 22 end attachment may be comprised of any material including but not limited to any various plasticized materials, fiberglass, any metal and/or metallic material, any material which may be comprised of any proportion of carbon fiber-based material, wood, rubber, vinyl, and/or any variation and/or combination of these and/or other materials. In some embodiments, an 22 end attachment may be comprised of other structures, shapes, sizes, and/or dimensions.

In some embodiments, attachments that may couple to an 22 end attachment of a 10 coil guide and/or any other component of an embodiment contemplated herein include but are not limited to one or more of the following: a 36 tip attachment, a disc, 32 quickdraw setter/remover, 34 brush attachment, 42 broom head attachment, duster, mop head, rake head, boat paddle, camera mounts for different types of cameras, fish net, spear, knife blade, skewer, fork, fishing reel, one or more line guiding eyelet, shovel head, snow shovel head, hoe head, paint brush, paint roller, squeegee, hook, swimming pool cleaning net, hatchet head, double-sided axe head, hammer head, sledge hammer head, pickaxe head, clamp, narrow cylinder to fit in a tarp grommet, plunger head, light, compass, pitchfork head, scythe head, and/or machete.

In some embodiments, some attachment items may couple to a 10 coil guide and/or any other component of an embodiment contemplated herein with only an 22 end attachment. Other attachment items may couple to an 22 end attachment and/or couple elsewhere to a 10 coil guide, 24 shaft, and/or any other component of an embodiment contemplated herein via a lock, 38 internal attaching mechanism, and/or 40 external attaching mechanism. FIGS. 6A to 6D illustrate by way of non-limiting examples a mechanism that includes both an 38 internal attaching mechanism which may couple to an 22 end attachment and an 40 external attaching mechanism which may couple to a 10 coil guide, 24 shaft, and/or any component of an embodiment contemplated herein.

In some embodiments, an 38 internal attaching mechanism may be comprised of metal and be 0.4 inches long and correspond to any threading in an 22 end attachment. An 40 external attaching mechanism may be comprised of metal, rubber, and plastic and fit on and/or around the exterior of a

10 coil guide similarly to a sleeve and be 6 inches in length, while a clamp that may be tightened may secure an 40 external attaching mechanism to such 10 coil guide. The shape and/or material of a 10 coil guide may assist with holding such 40 external attaching mechanism. Alternatively, some embodiments of an 38 internal attaching mechanism and/or 40 external attaching mechanism may be comprised of other shapes, sizes, dimensions, and/or materials, including but not limited to aluminum, any metallic material, plastic and/or any various plasticized materials, fiberglass, any material comprised of any proportion of carbon fiber-based material, wood, rubber, vinyl, and/or any variation and/or combination of these and/or any materials. In some embodiments, an 38 internal attaching mechanism and/or 40 external attaching mechanism may comprise other devices, mechanisms, and/or methods for coupling a 22 end attachment and/or any component of an embodiment contemplated herein.

Some embodiments of a 36 tip attachment may couple to an 22 end attachment of a 10 coil guide as illustrated by way of non-limiting examples in FIGS. 1D, 2A, and 2B. In some embodiments, a 36 tip attachment may comprise a cone or cylindrical shape whereby the bottom may be narrower than the top, with the bottom having a diameter of 0.5 inches and the top having a diameter of 0.8 inches. Some embodiments of a 36 tip attachment may be comprised of hard plastic internally with a rubber exterior and be 1 inch tall with a male end threading. Alternatively, some embodiments of a 36 tip attachment may be wider, narrower, or of equal diameter at the bottom than it is at the top, taper to a point or taper to a flat surface, and/or may be comprised of other shapes, sizes, dimensions, means of coupling, and/or materials, including but not limited to aluminum, any metallic material, plastic and/or any various plasticized materials, fiberglass, any material comprised of any proportion of carbon fiber-based material, wood, rubber, vinyl, and/or any variation and/or combination of these and/or any materials. In some embodiments, a 36 tip attachment may couple to an 22 end attachment and/or elsewhere on an embodiment contemplated herein by any means through which two components may be coupled.

In some embodiments, a 36 tip attachment may hold a disc in between said 36 tip attachment and/or 22 end attachment. Such disc may be used by way of non-limiting examples to keep an embodiment described herein from sinking into soft terrain such as snow, mud, and/or any other surface that could cause such embodiment to become submerged. By way of a non-limiting example, such disc may be a flat plastic circle with a 4 inch diameter and a hole in the middle wherein a 36 tip attachment holds said disc in place against an 22 end attachment. Alternatively, in some embodiments such disc may be comprised of other shapes, sizes, dimensions, and/or materials, including but not limited to aluminum, any metallic material, plastic and/or any various plasticized materials, fiberglass, any material comprised of any proportion of carbon fiber-based material, wood, rubber, vinyl, and/or any variation and/or combination of these and/or any materials.

In some embodiments, a 32 quickdraw setter/remover attachment may couple to an 22 end attachment of a 10 coil guide as illustrated by way of non-limiting examples in FIGS. 4A to 4E. In some embodiments, a 32 quickdraw setter/remover attachment may comprise a stainless steel rod extending away from its attachment location and/or forming a helical shape that fits around a carabiner of a quickdraw as illustrated by way of non-limiting examples in FIGS. 4A to 4E. Alternatively, some embodiments of a 32 quickdraw setter/remover may be comprised of any material, including but not limited to any metallic material, plastic and/or any various plasticized materials, fiberglass, any material comprised of any proportion of carbon fiber-based material, wood, rubber, vinyl, and/or any variation and/or combination of these and/or any materials. Some embodiments may be comprised of any means of coupling to an 22 end attachment including but not limited to corresponding recessed and protruding threading and/or any coupling, locking, and/or connecting device, mechanism, and/or series of components to allow such.

In some embodiments, a rod of a 32 quickdraw setter/remover may extend 6 inches before wrapping around in a helical shape. Also, such rod and helical shape may be 0.125 inches thick. Alternatively, some embodiments of a 32 quickdraw setter/remover may be comprised of any sizes, shapes, and/or dimensions.

In some embodiments, a 34 brush attachment may be coupled to a 22 end attachment of a 10 coil guide as illustrated by way of a non-limiting example in FIG. 5. Although FIG. 5 depicts by way of a non-limiting example an embodiment where a 34 brush attachment has a rod extending away from where the 34 brush attachment couples to an 22 end attachment with bristles protruding horizontally from 360 degrees. Such bristles may also protrude out from only select angles in specific locations on the horizontal and/or vertical portion of a 34 brush attachment. In addition, a 34 brush attachment may hold bristles with an object and/or shape other than that of a rod and/or may be comprised of any other material, including but not limited to plastic and/or any various plasticized materials, fiberglass, any material which may be comprised of any proportion of carbon fiber-based material, aluminum, any metallic material, wood, rubber, leather, vinyl, and/or any variation and/or combination of these and/or other materials. Some embodiments of a 34 brush attachment may be comprised of any shapes, sizes, and/or dimensions.

In some embodiments, a 44 coil strap may be utilized by a user to couple to and/or wrap around the rope, extension cord, or other materials coiled to hold the coiled materials in place. Some embodiments of a 44 coil strap may be comprised of nylon that is 2 inches wide and 16 inches long, with both ends coupling together via strips of corresponding hook and loop fasteners. Alternatively, in other embodiments, a 44 coil strap may be comprised of any fabric, including but not limited to canvas, vinyl, wool, cotton, nylon, leather, rope, string, cord, and/or elastic as well as rubber, plastic, metal, carbon fiber-based material, and/or any other fabric and/or material and/or mixture, combination, and/or variation thereof and/or may be comprised of any shape, size, dimension, description, and/or quantity. Also, the two ends of a 44 coil strap may couple together by any means in which two different ends of an object may be coupled together. By way of a non-limiting example, FIG. 8 illustrates a 44 coil strap wrapped around a rope.

In some embodiments, a 44 coil strap may couple to a rope, extension cord, or other material being coiled and/or hold such in orderly fashion, reducing tangling and/or reducing the need to tie one end of such rope, extension cord, or other material being coiled around itself. Alternatively, a 44 coil strap may be absent from some embodiments.

In some embodiments, any portion of a 10 coil guide, including but not limited to a 12 cover of coil guide, 14 body of coil guide, and/or 16 stopper of coil guide, may be coupled to a 30 coil guide clamp. Such portion of a 10 coil guide may comprise a 18 rope pinch. Such 30 coil guide clamp may couple to a staff. A purpose of such a 30 coil guide clamp may be so that a user who already has a sufficient staff may use that staff but couple 10 coil guides to such staff to utilize the coiling function, among other advantages. In some embodiments, a 30 coil guide clamp may be comprised of metal with rubber running along the portion of such 30 coil guide clamp that would touch a 24 shaft when clamped. A 30 coil guide clamp may hold a 14 body of coil guide as illustrated by way of non-limiting examples in FIGS. 7A to 7B. A 30 coil guide clamp may also comprise a hinge, other fastener, and/or movable coupling to couple to a 14 body of coil guide so that a 14 body of coil guide may be perpendicular to a staff as illustrated by way of a non-limiting example in FIG. 7A to be used for coiling, and/or a 14 body of coil guide may be rotated on such hinge, other fastener, and/or movable coupling to be parallel and/or up against such staff when hiking and/or transporting the staff as illustrated by way of a non-limiting example in FIG. 7B. Such hinge, other fastener, and/or movable coupling may lock in an open position of any degree or varying degrees, and/or lock in a closed position such that it requires additional effort to adjust such hinge, other fastener, and/or movable coupling from the locked position to any other position. Alternatively, some embodiments of a 30 coil guide clamp may be comprised of other shapes, sizes, dimensions, and/or materials, including but not limited to aluminum, any metallic material, plastic and/or any various plasticized materials, fiberglass, any material comprised of any proportion of carbon fiber-based material, wood, rubber, vinyl, and/or any variation or combination of these and/or any materials.

In some embodiments, a 14 body of coil guide that is configured to be coupled to a 30 coil guide clamp may comprise a grooved surface. Alternatively, some embodiments may comprise a surface with any other texture, shape, and/or dimensions.

In some embodiments, a 14 body of coil guide that is configured to be coupled to a 30 clamp may be coupled to a 16 stopper of coil guide as illustrated by way of a non-limiting example in FIG. 7B. In some embodiments, a 16 stopper of coil guide may rotate up and/or down, so as to abut against and/or come close to a 14 body of coil guide. In some embodiments, a 16 stopper of coil guide may help prevent whatever material is being coiled on 10 coil guides, whether rope, extension cords, or any other materials, from falling off the end of a 14 body of coil guide during and/or after the coiling process. In some embodiments, a 16 stopper of coil guide may lock in an open position of any degree or number of varying degrees and/or lock in a closed position such that it requires additional effort to adjust the position of such 16 stopper of coil guide. Alternatively, in some embodiments a 16 stopper of coil guide may have no locking mechanism such that it rotates throughout its entire range of motion without requiring any additional effort to rotate past any given point.

In some embodiments, a 16 stopper of coil guide may comprise one or more arms wherein a 16 stopper of coil guide couples with a 14 body of coil guide by a movable coupling, a bridge coupling one or more such arms, and/or one or more such arms that abut against and/or come close to a brake bump protruding on a 14 body of coil guide which may limit the range of rotation of such 16 stopper of coil guide. Alternatively, a 16 stopper of coil guide may be comprised of any components, dimensions, sizes, shape, material, may be comprised of other structures, may be coupled to a 14 body of coil guide by other means, and/or may interact with a brake bump in other manners or not at all. In some embodiments, a brake bump may be absent.

By way of a non-limiting example, use of an embodiment described herein may include coupling an end of a rope, extension cord, or other material being coiled to a 18 rope pinch. Then wrapping such rope, extension cord, or other material being coiled around a 14 body of coil guide of a bottom 10 coil guide on an end that is proximal to a 12 cover of guide. After wrapping around a bottom 10 coil guide bring the rope up to a top 10 coil guide and wrap around the 14 body of coil guide on the end that is proximal to a 12 cover of coil guide. Continue this process, placing each subsequent revolution of said rope, extension cord, or other material being coiled up against and/or close to the prior revolution working out towards a 16 stopper of coil guide. Once a 14 body of coil guide is covered with one layer of revolutions, then begin to place the next layer of revolutions on top of the prior layer of revolutions. Continue this process until the entire rope, extension cord, or other material being coiled has been coiled, at which point wrap a 44 coil strap around said rope, extension cord, or other material being coiled to hold such coil in place and remove the coil from the 10 coil guides. The example processes outlined above in this paragraph and elsewhere herein are for illustrative purposes only as other methods of use of an embodiment described herein are possible and contemplated herein.

Although the description above contains many specificities, these should not be construed as limiting in scope in any way but as merely providing illustrations of some possibilities of preferred embodiments of the combination of materials, components, functions, and/or uses contemplated herein. Any and all components described and/or alluded to herein may be comprised of a number of different materials and come in a number of different sizes, shapes, and dimensions and still adhere to the specifications set forth herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figures, diagrams, and drawings have been provided to illustrate non-limiting examples of potential embodiments.

Spatially relative terms, such as "inner," "outer," "beneath," "below." "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A coiling device comprising:
    (a) a cover of coil guide configured to be coupled with a body of coil guide with a moveable coupling with said body of said coil guide comprising a grooved surface;
    (b) a stopper of coil guide configured to be coupled with said body of coil guide with a moveable coupling comprising recessed holes in said body of coil guide, into which components of said stopper of said coil guide protrude;
    (c) said stopper of coil guide comprising more than one arm with each arm extending from where said stopper of said coil guide couples with said body of coil guide by said moveable coupling and a bridge coupling said arms;
    (d) said cover of coil guide comprising one or more of the following: a cutout with two or more opposing sides that vary in distance apart from one another along a length of said opposing sides such that some of portions of said opposing sides are closer than other portions of said opposing sides, a slit on an edge of said cover of coil guide inside which material may fit, and a clamp comprising a fulcrum and two levers with an end of each of the two levers of said clamp being held together unless pressure is exerted on an opposite end of one or more of said levers of said clamp.

2. The coiling device in accordance with claim 1, wherein said coiling device or any portion thereof further serves as a handle.

3. The coiling device in accordance with claim 1, wherein said arms of said stopper of coil guide abut against or come close to a brake bump or recess on said body of coil guide which may impact the range of said stopper of coil guide's rotation.

4. The coiling device in accordance with claim 1, further comprising means to couple in combination with one or more of the following attachment items: a quickdraw setter/remover attachment comprising a rod extending away from an attachment location and forming a helical shape that fits partially or completely around a carabiner of a quickdraw, a brush attachment, a tip attachment, and a broom head attachment.

5. The coiling device in accordance with claim 1, further comprising a coil strap to wrap around material on said coiling device which is adapted to be utilized by a user.

6. The coiling device in accordance with claim 1, coupled with one end of a shaft and another coiling device coupled to another end of the shaft.

7. A rock climbing device comprising:
    (a) a telescopic shaft comprising more than one interconnected pole segment, with said telescopic shaft comprising a top end and a bottom end, with the telescoping shaft further comprising one or more of the following: twist locks, cam locks, and button locks with corresponding holes in the interconnected pole segments;
    (b) a coiling device connected to one of the top and bottom end of the telescopic shaft, said coiling device comprising a cover of coil guide configured to be coupled with a body of coil guide with a moveable coupling with said body of said coil guide comprising a grooved surface, a stopper of coil guide configured to be coupled with said body of coil guide with a moveable coupling comprising recessed holes in said body of coil guide, into which components of said stopper of said coil guide protrude, said stopper of coil guide comprising more than one arm with each arm extending from where said stopper of said coil guide couples with said body of coil guide by said moveable coupling and a bridge coupling said arms, and said cover of coil guide comprising one or more of the following: a cutout with two or more opposing sides that vary in distance apart from one another along a length of said opposing sides such that some of portions of said opposing sides are closer than other portions of said opposing sides, a slit on an edge of said cover of coil guide inside which material may fit, and a clamp comprising a fulcrum and two levers with an end of each of the two levers of said clamp being held together unless pressure is exerted on an opposite end of one or more of said levers of said clamp.

8. The rock climbing device in accordance with claim 7, further comprising means to couple in combination with one or more of the following attachment items: a quickdraw setter/remover attachment comprising a rod extending away from an attachment location and forming a helical shape that fits partially or completely around a carabiner of a quickdraw, a brush attachment, and a broom head attachment.

9. A clamping device comprising:
    (a) a coil guide clamp configured to be coupled with a body of coil guide by a moveable coupling with said body of coil guide comprising a grooved surface;
    (b) a stopper of coil guide configured to be coupled with said body of coil guide with a moveable coupling comprising recessed holes in said body of coil guide, into which the components of said stopper of coil guide protrude;

(c) said stopper of coil guide comprising more than one arm with each said arm extending from where said stopper of coil guide couples with said body of coil guide by said moveable coupling and a bridge coupling said arms;

(d) wherein said arms that extend from where said stopper of coil guide couples with said body of coil guide by said moveable coupling abut against or come close to a brake bump or recess on said body of coil guide which impacts the range of said stopper of coil guide's rotation.

* * * * *